(12) United States Patent
Griffioen

(10) Patent No.: US 9,554,347 B2
(45) Date of Patent: Jan. 24, 2017

(54) AUTOMATIC CALIBRATION OF PROCESSING DELAY OF RADIO EQUIPMENT

(71) Applicant: Telefonaktiebolaget L M Ericsson (publ), Stockholm (SE)

(72) Inventor: Robert Griffioen, Ottawa (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 105 days.

(21) Appl. No.: 14/277,228

(22) Filed: May 14, 2014

(65) Prior Publication Data

US 2015/0334671 A1   Nov. 19, 2015

(51) Int. Cl.
*H04W 56/00* (2009.01)
*H04W 72/04* (2009.01)
*H04W 88/08* (2009.01)

(52) U.S. Cl.
CPC ..... *H04W 56/0035* (2013.01); *H04W 56/0085* (2013.01); *H04W 72/0446* (2013.01); *H04W 72/0453* (2013.01); *H04W 88/085* (2013.01)

(58) Field of Classification Search
CPC .......... H04W 56/0085; H04W 88/085; H04W 56/002; H04W 56/0035; H04W 72/0446; H04W 72/0453
(Continued)

(56) References Cited

U.S. PATENT DOCUMENTS 6,628,697 B1 * 9/2003 Douglas ................ H04J 3/0682
                                                     370/510

7,646,751 B2   1/2010 Osterling et al.
(Continued)

FOREIGN PATENT DOCUMENTS

EP   1630979 A1   3/2006
EP   1744572 A1   1/2007
(Continued)

OTHER PUBLICATIONS

PCT International Search Report from corresponding application PCT/IB2015/053535.
(Continued)

*Primary Examiner* — Mohammad Anwar
*Assistant Examiner* — Kokou R Detse
(74) *Attorney, Agent, or Firm* — Withrow + Terranova, PLLC

(57) ABSTRACT

A method and system for measuring end-to-end processing delay of the RE between an input interface and a transmit port in the downlink direction and a receive port and an output interface on the uplink direction is disclosed. The method and system if for use in a radio equipment node (RE) connected to a radio equipment control node (REC). Once the downlink and uplink radio channels are activated at a predetermined carrier frequency, a chirp sine wave is added at the input interface and the receive port such that the chirp sine wave becomes mixed with the carrier frequency. Sampling of a received downlink mixed signal is done at the transmit port and of the received uplink mixed signal at the output interface. The sampled mixed signals are then cross-correlated with a reference chirped sine wave to obtain a signal phase shift which is then converted to obtain a time delay associated with the end-to-end processing delay of the RE.

21 Claims, 4 Drawing Sheets

(58) Field of Classification Search
USPC .......................................................... 370/350
See application file for complete search history.

(56) References Cited

U.S. PATENT DOCUMENTS

| | | |
|---|---|---|
| 7,773,578 B2 | 8/2010 | Liu |
| 7,817,603 B2 | 10/2010 | Liu |
| 7,940,667 B1 | 5/2011 | Coady et al. |
| 8,422,484 B2 | 4/2013 | Iwai et al. |
| 8,599,827 B2 | 12/2013 | Irvine |
| 8,774,109 B2 | 7/2014 | Kenington et al. |
| 8,842,649 B2 | 9/2014 | Liu et al. |
| 2011/0310881 A1 | 12/2011 | Kenington |
| 2011/0310941 A1 | 12/2011 | Kenington |
| 2014/0185601 A1 | 7/2014 | Ilyadis |
| 2015/0334666 A1 | 11/2015 | Griffioen |

FOREIGN PATENT DOCUMENTS

| | | |
|---|---|---|
| EP | 2234442 A2 | 9/2010 |
| EP | 2367311 A2 | 9/2011 |
| WO | WO2006040653 A1 | 4/2006 |
| WO | 2013070613 A1 | 5/2013 |
| WO | 2013189553 A1 | 12/2013 |
| WO | 2014005759 A1 | 1/2014 |
| WO | 2015173758 A1 | 11/2015 |

OTHER PUBLICATIONS

PCT International Search Report from corresponding application PCT/IB2015/053571.
Common Public Radio Interface (CPRI); Interface Specification, CPRI Specification V4.0 (Jun. 30, 2008).
Benesty, Jacob et al., "Time Delay Estimation via Minimum Entropy", IEEE Signal Processing Letters, vol. 14, No. 3, Mar. 2007, pp. 157-160.
Author Unknown, "Common Public Radio Interface (CPRI); Interface Specification," CPRI Specification, V1.4, Mar. 31, 2006, 64 pages.
Author Unknown, "Common Public Radio Interface (CPRI); Interface Specification," CPRI Specification V2.0, Oct. 1, 2004, 75 pages.
Non-Final Office Action for U.S. Appl. No. 14/491,129, mailed Mar. 10, 2016, 14 pages.
Non-Final Office Action for U.S. Appl. No. 14/491,129, mailed Oct. 21, 2016, 22 pages.
International Search Report and Written Opinion for International Patent Application No. PCT/IB2015/053539, mailed Aug. 27, 2015, 13 pages.

* cited by examiner

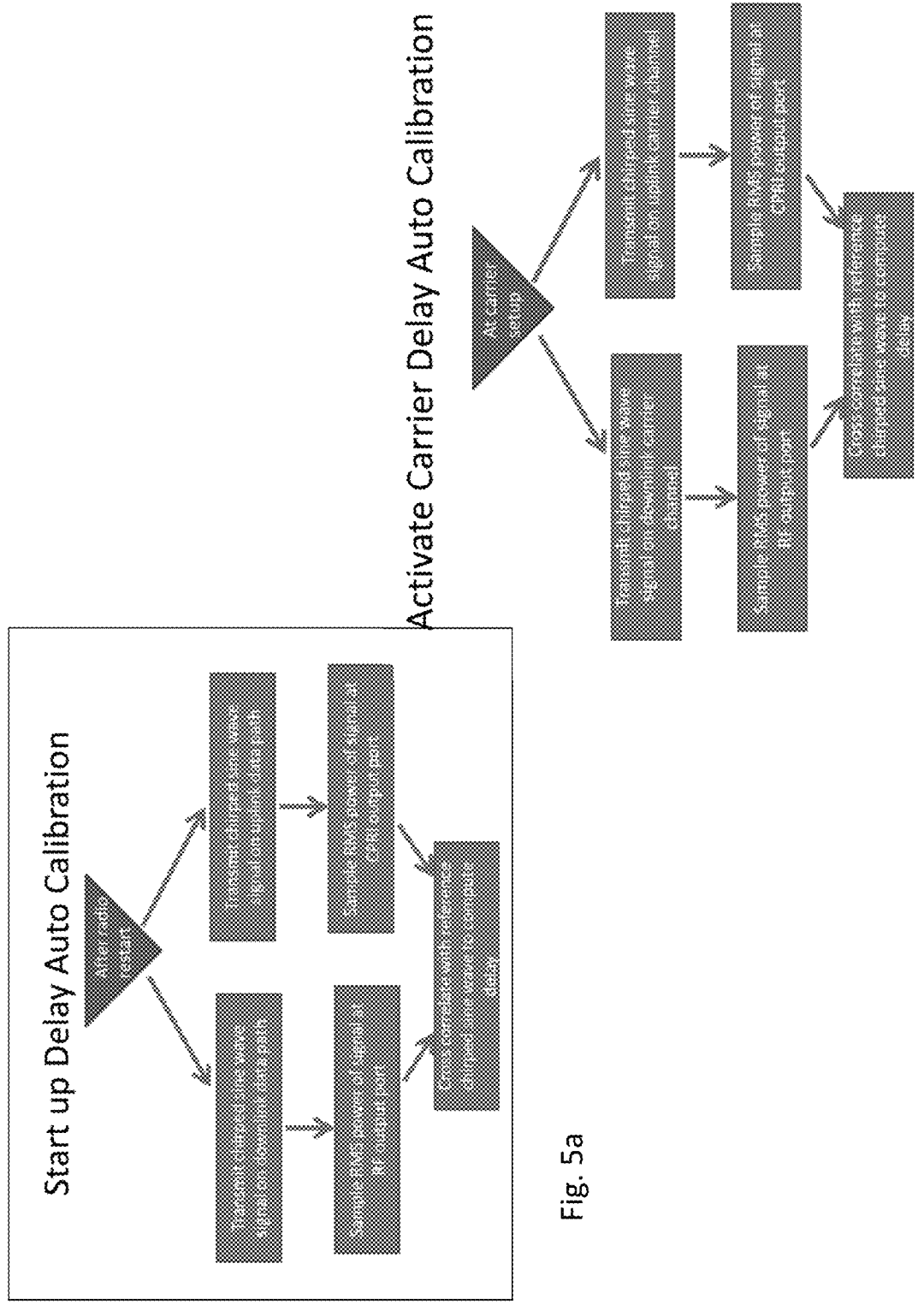

AUTOMATIC CALIBRATION OF PROCESSING DELAY OF RADIO EQUIPMENT

TECHNICAL FIELD

The present disclosure relates to a base station in a cellular communication network and more particularly relates to compensation of radio equipment processing delays.

BACKGROUND

In wireless, or cellular, communication networks, it is important that the downlink and uplink frame timing be synchronized between a base station and mobile devices served by the base station. The mobile devices connected to the base station use the same transmit and receive frequencies.

To ensure that there is no interference between the mobile devices, the mobile devices are assigned time slots or sub-channel frequencies depending on the type of multiplexing (e.g., Time Division Duplex (TDD) or Frequency Division Duplex (FDD)). In either case, frame timing must be precisely maintained over radio links between the base station and the mobile devices.

As shown in FIG. 1, timing must be aligned between the radio equipment controller (REC) 10 and the radio equipment (RE) 12 such that the first sample of downlink (DL) radio frame is transmitted into the air, i.e. reach the Antenna Reference Point (ARP) 14, at the same time as the REC's transmit reference point (BFN@TRP) 16. The allowed timing error in the radio is typically 20 nsec. This means that the first sample may reach the ARP 14 at BFN@TRP 16 with ±20 ns delay.

On the uplink (UL) the first sample of the UL radio frame is the one received at the ARP 14 at BFN@TRP. The allowed timing error in the radio is also 20 nsec. This means that the sample marked by the radio as the first in the UL radio frame must have entered the ARP 14 at BFN@TRP±20 ns.

For downlink path delay compensation, the REC advances the downlink baseband data such that it arrives at the radio's antenna reference (ARP) 14 point precisely when it starts out at the REC's transmit reference point 16 (BFN@TRP). The REC computes the compensation using the measured downlink delay to the radio and the radio downlink processing delay it receives from the radio during CPRI path setup.

For the uplink path delay compensation, the radio uses path delay information, it receives from the REC, and it's internal uplink processing delay to advance the CPRI data such that the arrival time of this uplink data is aligned with the outbound data. It is up to the radio to provide further internal timing compensation for each carrier and account for variations due to frequency, operating temperature and component age on both the uplink and downlink data paths.

During radio production both the downlink and uplink data paths must be precisely calibrated for timing alignment. The in-equipment delay or Toffset obtained at production and stored at each radio is then used for the synchronization process. For this to work, a large amount of delay calibration data must be stored in non-volatile memory. A radio must be re-calibrated after factory repairs and this process is complex and time consuming. In addition, with change in frequency, temperature and component aging, the stored in-equipment delay can change which results in timing errors. Although the equipment is designed to allow certain timing errors, wide variations can still occur. If such large variations occur, further calibration is required in the field, which is expensive, time consuming, and introduces maintenance problems.

As such, there is a need for an automatic delay calibration technique which eliminates the need to store calibration data with each radio.

SUMMARY

It is an object of the present disclosure to obviate or mitigate at least one disadvantage of the prior art.

One embodiment of the present disclosure relates to a method for use in a radio equipment node (RE) connected to a radio equipment control node (REC) for measuring end-to-end processing delay of the RE between an input interface and a transmit port in the downlink direction and a receive port and an output interface on the uplink direction. Once the downlink and uplink radio channels are activated at a predetermined carrier frequency, a chirp sine wave is added at the input interface and the receive port such that the chirp sine wave becomes mixed with the carrier frequency. Sampling of a received downlink mixed signal is done at the transmit port and of the received uplink mixed signal at the output interface. The sampled mixed signals are then cross-correlated with a reference chirped sine wave to obtain a signal phase shift which is then converted to obtain a time delay associated with the end-to-end processing delay of the RE.

In another embodiment, a system for use in a radio equipment node (RE) connected to a radio equipment control node (REC) for measuring end-to-end processing delay of the RE between an input interface and a transmit port in the downlink direction and a receive port and an output interface on the uplink direction is disclosed. A mixing circuit is provided for adding at the input interface and the receive port, a chirp sine wave to the activated radio channel such that the chirp sine wave becomes mixed with the carrier frequency. A data sampler is used for sampling at the transmit port a received downlink mixed signal and at the output interface a received uplink mixed signal. A processor performs cross-correlation of the received mixed signal with a reference chirped sine wave to obtain a signal phase shift and a converter performs conversion of the phase shift obtained between the mixed signal and the reference chirped sine wave to a time delay associated with the processing delay information of the RE.

In another embodiment, a method is disclosed for use in a radio equipment node (RE) connected to a radio equipment control node (REC) for measuring end-to-end processing delay of the RE between an input interface and a transmit port in the downlink direction and a receive port and an output interface on the uplink direction. Once a downlink radio channel is activated at a predetermined carrier frequency, a chirp sine wave is added at the input interface such that it becomes mixed with the carrier frequency. Sampling of a received downlink mixed signal is then done at the transmit port once converted to an analog RF signal. The sampled mixed signal is then cross-correlated with a reference chirp sine wave to obtain a signal phase shift and the signal phase shift then converted to a time delay associated with the downlink processing delay of said RE. Similarly, once the uplink radio channel is activated at a predetermined carrier frequency, the received carrier frequency is mixed at the receive port with a chirp sine wave. Sampling of a received uplink mixed carrier frequency signal is then done at the output interface once the mixed signal is converted to a digital signal. The sampled mixed signal is then cross-correlated with the reference chirp sine wave to obtain a signal phase shift and then converted to a time delay associated with the uplink processing delay of the RE. The downlink and uplink processing delays are then added to obtain the time delay associated with the end-to-end processing delay of the RE.

In yet another embodiment, there is provided a system for use in a radio equipment node (RE) connected to a radio equipment control node (REC) for measuring end-to-end processing delay of the RE between an input interface and a transmit port in the downlink direction and a receive port and an output interface on the uplink direction. A first mixing circuit is used for adding at the input interface, a chirp sine wave to the activated radio channel such that the chirp sine wave becomes mixed with the downlink carrier frequency. A first data sampler is used for sampling at the transmit port a received downlink mixed signal once converted to an analog RF signal. A processor cross-correlates the received mixed signal with a reference chirped sine wave to obtain a signal phase shift which is then converted for obtaining a time delay associated with the downlink processing delay of said RE. Similarly, a second mixing circuit is provided for adding at the receive port a chirp sine wave to the activated radio channel such that the chirp sine wave becomes mixed with the uplink carrier frequency. A second data sampler at the output interface is used for sampling the received uplink mixed carrier frequency signal once the signal is converted to a digital signal, wherein the processor further cross-correlates the uplink mixed signal with the reference chirp sine wave to obtain an uplink signal phase shift and the converter converts the uplink signal phase shift to the uplink processing delay for adding with the downlink processing delay to obtain the combined end-to-end processing delay of the RE.

Other aspects and features of the present disclosure will become apparent to those ordinarily skilled in the art upon review of the following description of specific embodiments of the invention in conjunction with the accompanying figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 5a is a flow chart illustrating a process for measuring in-equipment delay at start up; and FIG. 5b is a flow chart illustrating a process for measuring in-equipment delay at carrier activation.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
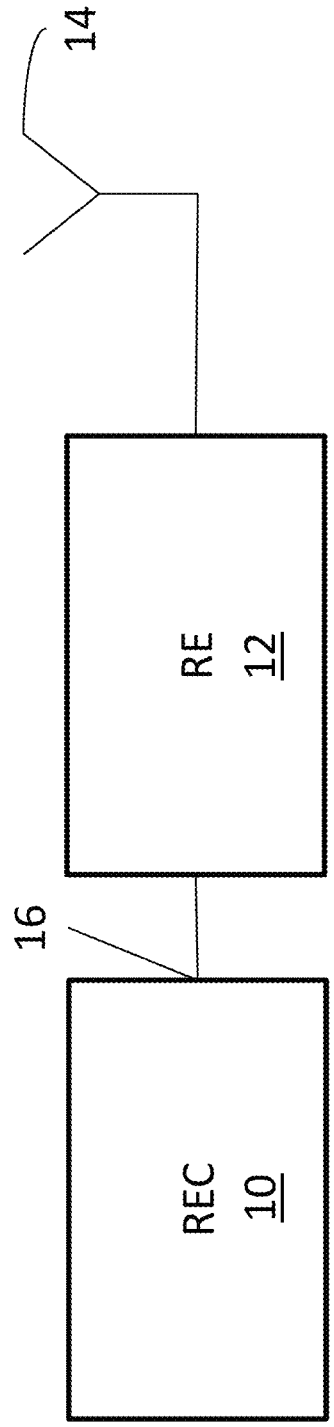
FIG. 1 is a block diagram of a typical base station which is typically comprised of a radio equipment controller and radio equipment.

As indicated previously with reference to FIG. 1, in order to maintain precise frame timing, a number of delays are determined. The particular delays can be described as follows in relation to FIG. 2. According to the Common Public Radio Interface (CPRI) specification, a base station 10 includes a radio equipment controller (REC) 12 and a radio equipment (RE) 14. The REC 12 is typically connected to the RE 14 via one or more cables, such as one or more fiber cables. The REC 12 includes radio functions in the digital baseband domain, whereas the RE 14 includes analog radio frequency functions. A generic interface between the REC 12 and the RE 14, which is referred to herein as a CPRI interface, enables communication between the REC 12 and the RE 14.

Figure 2:
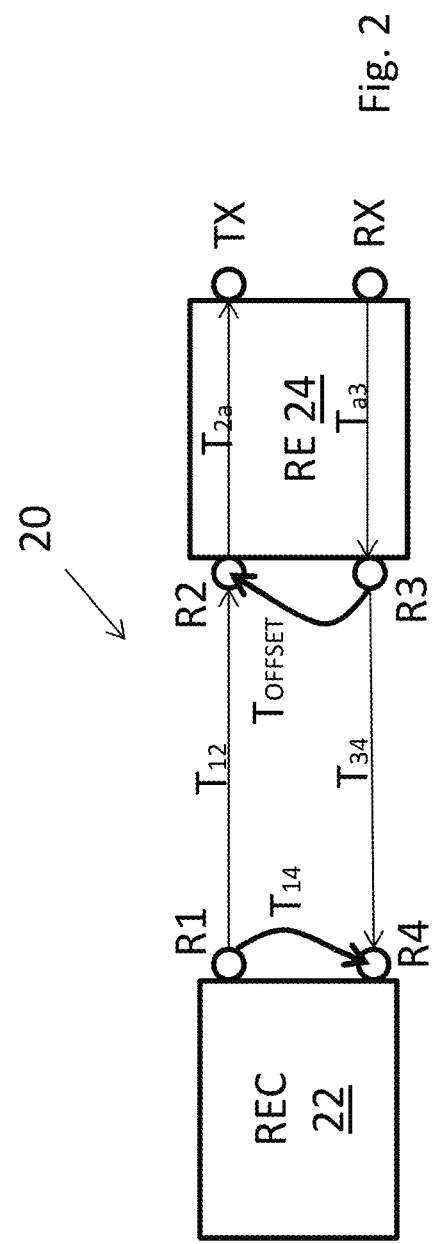
FIG. 2 is a block diagram of the base station of FIG. 1, along with various delays accounted for during conventional synchronization.

In order to maintain precise frame timing, a number of delays are determined. Specifically, as shown in FIG. 2, these delays include:

T12: Cable delay (T12) is a delay between an output interface (R1) of the REC 22 and an input interface (R2) of the RE 24 due to a cable connecting the output interface (R1) of the REC 22 to the input interface (R2) of the RE 24, TOFFSET: In-equipment delay (TOFFSET) is an internal delay of the RE 24 from the input interface (R2) of the RE 24 to an output interface (R3) of the RE 24, T34: Cable delay (T34) is a delay from the output interface (R3) of the RE 24 to an input interface (R4) of the REC 22 due to a cable connecting the output interface (R3) of the RE 24 to the input interface (R4) of the REC 22, T14: Total round-trip delay (T14) that is the sum of T12, TOFFSET and T34, T2a: In-equipment downlink delay (T2a) is an internal delay of the RE 24 from the input interface (R2) of the RE 24 to a transmit port (TX) or antenna of the RE 24, Ta3: In-equipment uplink delay (Ta3) is an internal delay of the RE 24 from a receive port (RX) or antenna of the RE 24 to the output interface (R3) of the RE 24.

In operation, the RE 24 obtains the in-equipment delay (Toffset), the in-equipment downlink delay (T2a), and the in-equipment uplink delay (Ta3) and reports those estimates to the REC 22. The cable delays (T12 and T34) are then determined by the REC 22 using a synchronization process.

For the synchronization process, the REC 22 transmits a sync byte, which is referred to as a K28.5 sync byte in the CPRI specification, from the output interface (R1) of the REC 22 to the input interface (R2) of the RE 24. The RE 24 then passes the sync byte from the input interface (R2) of the RE 24 to the output interface (R3) of the RE 24 such that the sync byte is looped-back to the REC 22. Using the sync byte, the REC 22 measures the total round-trip delay (T14), which is the amount of time between a time at which the sync byte was sent from the output interface (R1) of the REC 22 and a time at which the sync byte was received at the input interface (R4) of the REC 22. Then, the REC 22 computes the cable delays (T12 and T34) as:

$$T12 = T34 = \frac{(T14 - TOFFSET)}{2}$$

where T14 is the total round-trip delay measured by the REC 22 using the sync byte.

Figure 3:
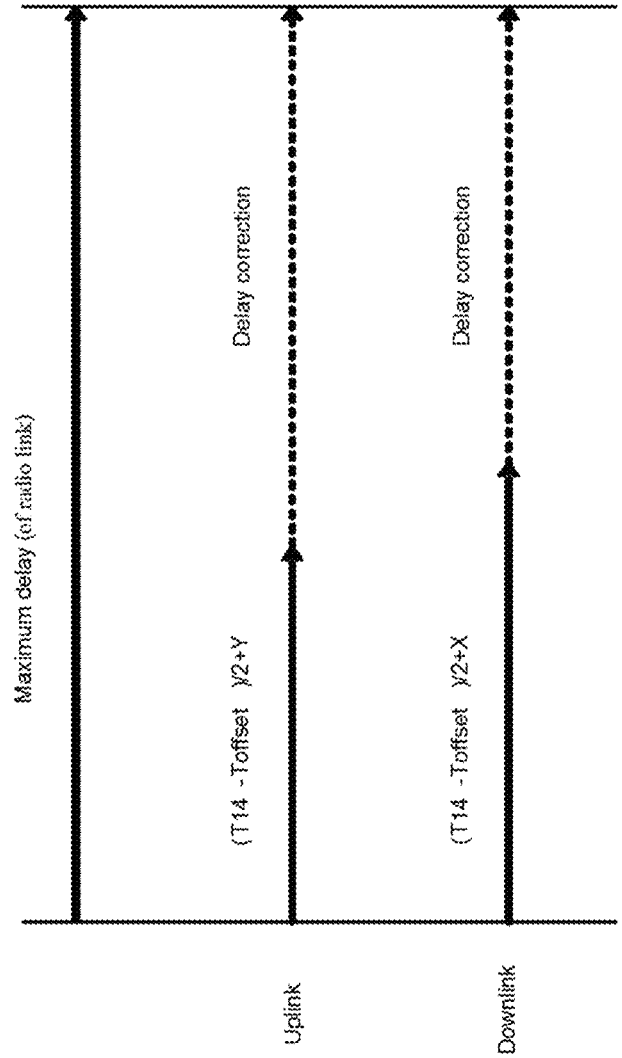
FIG. 3 illustrates the base station correction delay mismatch.

With reference to FIG. 3, we have shown the base station delays and required corrections. As illustrated above, the base station computes the connection cable delay using (T14−Toffset)/2. The reported in-equipment delay and connection cable delay values are then used to compute the buffering to align the uplink and downlink frames over the CPRI link. The base station corrects for the uplink and downlink mismatch. The Y (uplink in-equipment delay) and X (downlink in-equipment delay) are aligned using buffers inside the base station.

Figure 4:
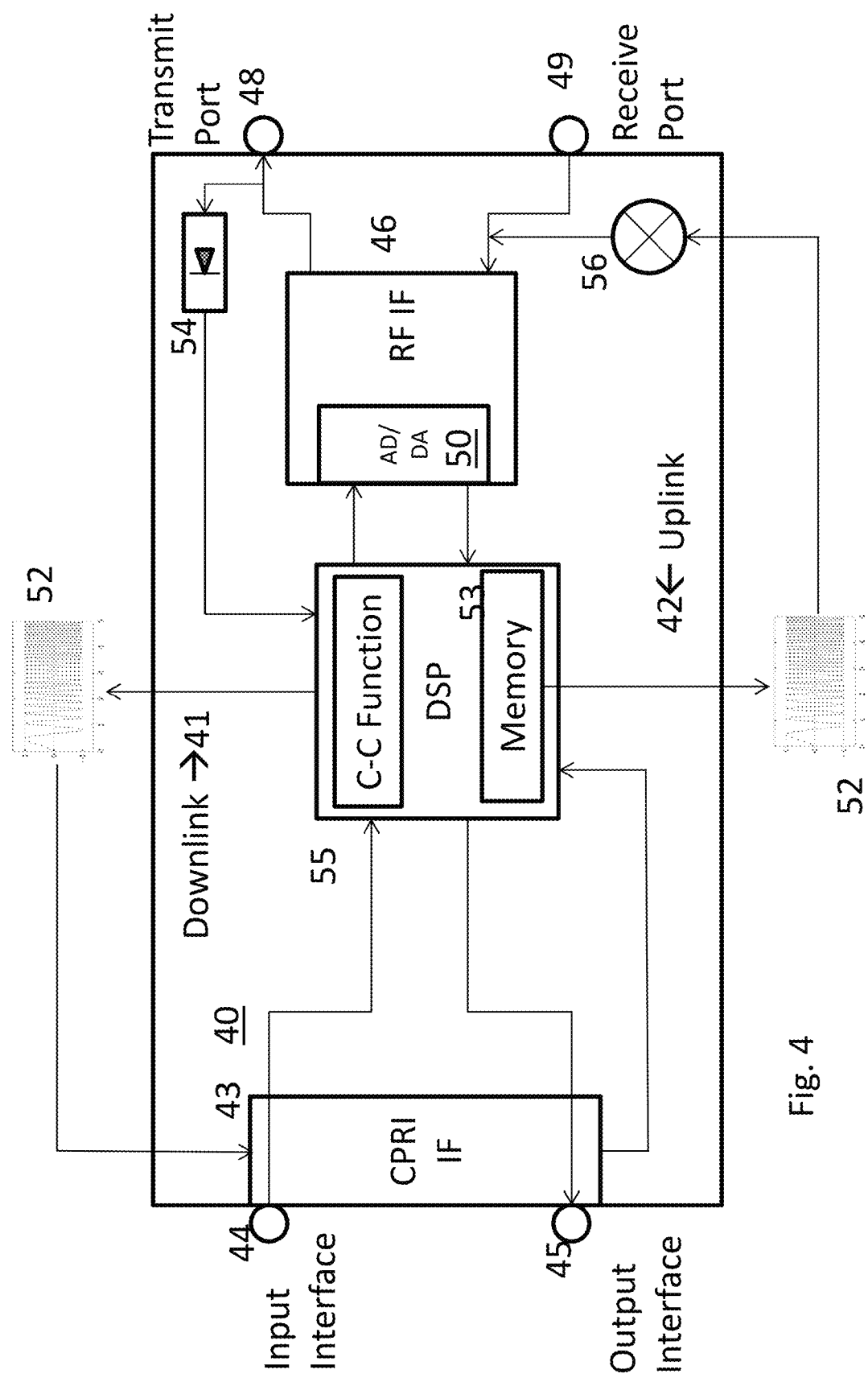
FIG. 4 is a block diagram of the radio equipment for measuring actual in-equipment delays in the downlink and uplink directions according to one embodiment of the present disclosure.

With reference to FIG. 4, we have shown a block diagram of the radio equipment for measuring actual in-equipment delays in the downlink and uplink directions according to one embodiment of the present disclosure. With the embodiments of the present disclosure, there are disclosed systems and methods for measuring end-to-end processing delay in a radio equipment node (RE) connected to a radio equipment control node (REC) between an input interface and a transmit port in the downlink direction and a receive port and an output interface on the uplink direction. Once a downlink radio channel is activated at a predetermined carrier frequency, a chirp sine wave is added at the input interface such that it becomes mixed with the carrier frequency. Sampling of a received downlink mixed signal is then done at the transmit port once converted to an analog RF signal. The sampled mixed signal is then cross-correlated with a reference chirp sine wave to obtain a signal phase shift and the signal phase shift then converted to a time delay associated with the downlink processing delay of said RE. Similarly, once the uplink radio channel is activated at a predetermined carrier frequency, the received carrier frequency is mixed at the receive port with a chirp sine wave. Sampling of a received uplink mixed carrier frequency signal is then done at the output interface once the mixed signal is converted to a digital signal. The sampled mixed signal is then cross-correlated with the reference chirp sine wave to obtain a signal phase shift and then converted to a time delay associated with the uplink processing delay of the RE. The downlink and uplink processing delays are then added to obtain the time delay associated with the end-to-end processing delay of the RE.

One advantage of using the system and method of the present disclosure is that the radio re-computes its processing delay after each restart. This avoids having to store component age and operating frequency and temperature calibration data. As indicated above, this data is necessary to re-adjust the factory recorded delay data. Each radio has analog power amplifiers and filter components whose transit delay is affected by age and operating frequency and temperature. The digital components are not as affected by age but their transit delay is still affected by channel frequency and operating temperature.

Another advantage is that the radio can compute its processing delay for each new carrier setup request, such that the base station is provided with the most current radio processing delay information. When there are cellular network timing issues trouble shooters can use this precision measured data to determine root cause of timing failures. As this data has been measured by the radio for the current operating conditions, the technician does not have to repeat these measurements in the field.

With reference to FIGS. 4, 5a and 5b, we have shown a block and flow diagrams illustrating the radio auto calibration of processing delay according to an embodiment of the present disclosure. In an embodiment of the present invention, measurement of the end-to-end processing delay is done at start-up as shown in FIG. 5a and upon activation of a carrier as shown in FIG. 5b.

In FIG. 4, the in-equipment delay of radio equipment (RE) 40 is measured in the downlink 41 and uplink 42 directions. The radio is comprised of a CPRI interface 43 for interfacing with the REC (not shown) via an input interface 44 and an output interface 45. The radio also has an RF interface 46 for interfacing with the radio antennas (not shown) via the transmit port 48 and receive port 49. The radio also has a digital-to-analog (DA) converter and an analog-to-digital (AD) converter 50 at the RF interface 46 and a digital signal processor (DSP) 51 to manage and control the automatic delay calibration functionalities of the radio 40.

In order to measure the in-equipment delay of the radio 40, on the downlink path 41, a low frequency chirped sine wave 52 is injected into the CPRI interface 43 at the input thereof 44. A chirped sine wave is a signal which varies from a low to a higher frequency. In one embodiment, the chirped sine wave varies from 100 KHz to 1 MHz. The chirped sine wave can be a digital signal either stored in memory 53 or generated on demand using simple trigonometric functions running in the DSP 51. At the CPRI interface, the chirped sine wave is added to the baseband section as data. The mixed downlink signal is passed through the radio converted to an analog signal at DA 50 at the RF interface 48, and exit at the transmit port 48 as a downlink RF signal. The downlink RF signal is then sampled at the transmit port 48 by means of an RF microwave diode 54. The RF microwave diode 54 is used to sample the RF output power of the RF signal on the downlink channel. In one embodiment, the RF microwave diode 54 samples the RMS output power at a rate at least double the baseband channel rate for 10 msec.

The output of the RF microwave diode 54 is fed to a cross-correlating function 55 of the DSP 51. Cross-correlation is a signal processing technique used to measure the similarity between two waveforms as a function of a time-lag applied to one of the waveforms. In the present embodiment, the added chirped sine wave signal is delayed as it travels the downlink data path of the radio from the input interface 44 to the transmit port 48 or the uplink data path from the receive port 49 to the output interface 45. The cross-correlation measures the delay to a resolution of +/−1 nsec.

In the present embodiment, the cross-correlation is done against the original chirped sine wave to derive a phase shift between the original chirped sine wave and the recovered sine wave at the output of the RF microwave diode 54. Computation of the signal path delay from the cross-correlation function is a common mathematical technique and need not be described further.

In order to measure the in-equipment delay of the radio 40, on the uplink path 42, the low frequency chirped sine wave 52 is mixed with the RF carrier frequency by means of a diode mixer 56 and then injected into the RF interface 46 at the receive port input thereof.

In the present embodiment, the diode mixer 56 mixes a 92.16 MHz chirped sine wave with an RF frequency corresponding to the carrier frequency of the uplink channel.

The mixed uplink signal is passed through the radio RF interface 46, converted to a digital signal, and is recovered at the transmit port 48 of the CPRI interface by sampling 10 msec of the received baseband signal.

The sampled output of the CPRI interface 43 is fed to the cross-correlating function 55 of the DSP 51. As for the downlink path, in the present embodiment, the cross-correlation is done against the original chirped sine wave to derive a phase shift between the original chirped sine wave and the recovered sine wave at the output 45 of the CPRI interface 43. Computation of the signal path delay is then done as before from the cross-correlation function. The downlink and uplink path delays are then combined to obtain the end-to-end processing delay of the RE or Toffset. These computed path delays are also used to provide precise time alignment adjustment on the uplink and downlink paths of the RE.

The following acronyms are used throughout this disclosure.
ASIC Application Specific Integrated Circuit
CPRI Common Public Radio Interface
DL Downlink
FDD Frequency Division Duplex
FPGA Field Programmable Gate Array
RE Radio Equipment
REC Radio Equipment Controller
RF Radio Frequency
RMS Root Mean Square
TDD Time Division Duplex
UL Uplink Those skilled in the art will recognize improvements and modifications to the preferred embodiments of the present disclosure. All such improvements and modifications are considered within the scope of the concepts disclosed herein and the claims that follow.

What is claimed is:

1. A method for use in a radio equipment node (RE) connected to a radio equipment control node (REC) for measuring end-to-end processing delay of the RE between an input interface and a transmit port in the downlink direction and a receive port and an output interface on the uplink direction, comprising:
   a. activating downlink and uplink radio channels at a predetermined carrier frequency;
   b. adding at said input interface and said receive port, a chirp sine wave to the activated radio channels such that the chirp sine wave becomes mixed with the carrier frequency;
   c. sampling at the transmit port a received downlink mixed signal and at the output interface a received uplink mixed signal;
   d. cross-correlating the sampled mixed signals with a reference chirped sine wave to obtain a signal phase shift; and
   e. converting the phase shift obtained from the cross-correlating step to a time delay associated with the end-to-end processing delay of said RE.

2. A method as defined in claim 1, wherein when said downlink radio channel is activated at start up, the radio downlink channel is set at mid band center frequency with minimum amplifier output power.

3. A method as defined in claim 2, wherein said chirp sine wave is added by being injected into the activated radio channel at said input interface with a sampling rate corresponding to the maximum channel bandwidth, such that it becomes mixed to the carrier channel at mid band.

4. A method as defined in claim 3, wherein the output signal RMS power of said received downlink mixed signal is sampled at the transmit port once converted to an analog RF signal.

5. A method as defined in claim 4, wherein said sampling is done using a microwave RF diode at the sample rate of 2× maximum channel rate for 10 msec.

6. A method as defined in claim 1, wherein when said uplink radio channel is activated at start up, the radio uplink channel is set at mid band center frequency.

7. A method as defined in claim 6, wherein said chirp sine wave is a 92.16 MHz chirped sine wave signal which is mixed with a received carrier frequency and injected into said receive port.

8. A method as defined in claim 7, wherein said mixed signal is converted to a digital signal and a 10 msec sample of said mixed signal is taken at said output interface before being cross-correlated with the said reference chirp sine wave.

9. A method as defined in claim 1, wherein when said downlink radio channel is activated at carrier activation, the radio downlink channel is set a carrier frequency and minimum amplifier output power.

10. A method as defined in claim 9, wherein said chirp sine wave is added by being injected into the activated radio channel at said input interface with a sampling rate corresponding to the maximum channel bandwidth, such that it becomes mixed to the carrier channel at mid band.

11. A method as defined in claim 10, wherein the output signal RMS power of said received downlink mixed signal is sampled at the transmit port once converted to an analog RF signal.

12. A method as defined in claim 11, wherein said sampling is done using a microwave RF diode at the sample rate of 2× maximum channel rate for 10 msec.

13. A method as defined in claim 1, wherein when said uplink radio channel is activated at carrier activation, the radio uplink channel is set at carrier frequency.

14. A method as defined in claim 13, wherein said chirp sine wave is a 92.16 MHz chirped sine wave signal which is mixed with a received carrier frequency and injected into said receive port.

15. A method as defined in claim 13, wherein said mixed signal is converted to a digital signal and a 10 msec sample is taken at said output interface before being cross-correlated with said reference chirp sine wave.

16. A system for use in a radio equipment node (RE) connected to a radio equipment control node (REC) for measuring end-to-end processing delay of the RE between an input interface and a transmit port in the downlink direction and a receive port and an output interface on the uplink direction, comprising:
   a. a mixing circuit for adding at said input interface and said receive port, a chirp sine wave to the activated radio channel such that the chirp sine wave becomes mixed with the carrier frequency;
   b. a data sampler for sampling at the transmit port a received downlink mixed signal and at the output interface a received uplink mixed signal;
   c. a processor for cross-correlating the received mixed signal with a reference chirped sine wave to obtain a signal phase shift; and
   d. a converter for converting the phase shift obtained between the mixed signal and the reference chirped sine wave to a time delay associated with the processing delay information of said RE.

17. A system as defined in claim 16, wherein said data sampler comprises a microwave RF diode for sampling the received downlink mixed signal RMS power at the sample rate of 2× maximum channel rate for 10 msec once converted to an analog signal.

18. A system as defined in claim 16, wherein said mixing circuit is a diode mixer for mixing a 92.16 MHz chirped sine wave signal with the received carrier frequency and for injection into the receive port.

19. A system as defined in claim 18, further comprising an analog to digital converter for converting said mixed signal before being sampled and cross-correlated.

20. A method for use in a radio equipment node (RE) connected to a radio equipment control node (REC) for measuring end-to-end processing delay of the RE between an input interface and a transmit port in the downlink direction and a receive port and an output interface on the uplink direction, comprising:
 a. activating a downlink radio channel at a predetermined carrier frequency;
 b. adding a chirp sine wave at said input interface such that it becomes mixed with the carrier frequency;
 c. sampling at the transmit port a received downlink mixed signal once converted to an analog RF signal;
 d. cross-correlating the sampled mixed signal with a reference chirp sine wave to obtain a signal phase shift;
 e. converting the signal phase shift to a time delay associated with the downlink processing delay of said RE;
 f. activating an uplink radio channel at a predetermined carrier frequency;
 g. mixing at the receive port a chirp sine wave with a received carrier frequency;
 h. sampling at the output interface a received uplink mixed carrier frequency signal once said mixed signal is converted to a digital signal;
 i. cross-correlating the sampled mixed signal with a reference chirp sine wave to obtain a signal phase shift;
 j. converting the signal phase shift to a time delay associated with the uplink processing delay of said RE; and
 k. adding the downlink and uplink processing delays to obtain the time delay associated with the end-to-end processing delay of said RE.

21. A system for use in a radio equipment node (RE) connected to a radio equipment control node (REC) for measuring end-to-end processing delay of the RE between an input interface and a transmit port in the downlink direction and a receive port and an output interface on the uplink direction, comprising:
 a. a first mixing circuit for adding at said input interface, a chirp sine wave to the activated radio channel such that the chirp sine wave becomes mixed with the downlink carrier frequency;
 b. a first data sampler for sampling at the transmit port a received downlink mixed signal once converted to an analog RF signal;
 c. a processor for cross-correlating the received mixed signal with a reference chirped sine wave to obtain a signal phase shift;
 d. a converter for converting the phase shift obtained between the mixed signal and the reference chirped sine wave to a time delay associated with the downlink processing delay of said RE;
 e. a second mixing circuit for adding at said receive port a chirp sine wave to the activated radio channel such that the chirp sine wave becomes mixed with the uplink carrier frequency;
 f. a second data sampler at said output interface for sampling the received uplink mixed carrier frequency signal once said signal is converted to a digital signal, wherein said processor further cross-correlates said uplink mixed signal with said reference chirp sine wave to obtain an uplink signal phase shift and said converter converts the uplink signal phase shift to the uplink processing delay for adding with said downlink processing delay to obtain the combined processing delay of said RE.

\* \* \* \* \*